(12) United States Patent
MacDougall et al.

(10) Patent No.: US 10,578,027 B1
(45) Date of Patent: Mar. 3, 2020

(54) COMBUSTOR BLADE AND VANE SPACING FOR ICE CRYSTAL PROTECTION FOR A GAS TURBINE ENGINE

(71) Applicant: ROLLS-ROYCE PLC, London (GB)

(72) Inventors: Duncan A MacDougall, Derby (GB); Ian J Bousfield, Nottingham (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/411,312

(22) Filed: May 14, 2019

(30) Foreign Application Priority Data

Dec. 14, 2018 (GB) .................................. 1820400.8

(51) Int. Cl.
*F01D 25/02* (2006.01)
*F02C 7/30* (2006.01)

(52) U.S. Cl.
CPC ................ *F02C 7/30* (2013.01); *F01D 25/02* (2013.01)

(58) Field of Classification Search
CPC ...... F02C 7/05; F02C 7/047; B64D 2033/022; B64D 2033/0233; F05D 2270/10; F01D 25/02

See application file for complete search history.

(56) References Cited

U.S. PATENT DOCUMENTS

2012/0275922 A1* 11/2012 Praisner .................. F01D 9/041
416/223 A

OTHER PUBLICATIONS

Vishwas Iyengar, Aug. 4, 2007, A First Principles Based Methodology for Design of Axial Compressor Configurations, Georgia Institute of Technology (Year: 2007).*

* cited by examiner

*Primary Examiner* — Gerald L Sung
*Assistant Examiner* — Todd N Jordan
(74) *Attorney, Agent, or Firm* — Oliff PLC

(57) ABSTRACT

A gas turbine engine includes a fan, compressor, combustor, and turbine coupled to the compressor through a shaft. The compressor includes first, second, and third stages with respective rotor blades and stator vanes. The rotor blades and stator vanes are arranged such that a sum of mid-span axial gaps between the trailing edge of the first rotor blades and the leading edge of the first stator vanes, the trailing edge of the first stator vanes and the leading edge of the second rotor blades, the trailing edge of the second rotor blades and the leading edge of the second stator vanes, and the trailing edge of the second stator vanes and the leading edge of the third rotor blades is equal to $$a \times \sqrt{\frac{\text{inlet flow function}}{10}}.$$

$a \geq 75$ mm and the inlet flow function $= \frac{m\sqrt{T}}{P}$.

17 Claims, 2 Drawing Sheets

US 10,578,027 B1

COMBUSTOR BLADE AND VANE SPACING FOR ICE CRYSTAL PROTECTION FOR A GAS TURBINE ENGINE

The present disclosure relates generally to gas turbine engines, and more specifically to arrangements for ice crystal protection for a gas turbine engine.

Gas turbine engines are used to power aircraft, watercraft, power generators, and the like. A gas turbine engine generally comprises, in axial flow series from front to aft, an air intake, a fan, one or more compressors, a combustor, one or more turbines, and an exhaust nozzle. Air entering the air intake is accelerated by the fan to produce two air flows: a first air flow (core engine flow) into compressor and a second air flow (bypass flow) which passes through a bypass duct to provide propulsive thrust. Air entering the compressor is compressed, mixed with fuel and then fed into the combustor, where combustion of the air/fuel mixture occurs. The high temperature and high energy exhaust fluids are then fed to the turbine, where the energy of the fluids is converted to mechanical energy to drive the compressor in rotation by suitable interconnecting shaft.

The compressor may be a multi-stage compressor, wherein each compressor stage comprises in axial flow series a row of rotor blades and a row of stator vanes. A radially inner end of the rotor blades are connected to a hub that define an inner annulus. A casing circumscribes the rotor blades and the stator vanes and defines an outer annulus. The rotor blades and the stator vanes each have a root and an aerofoil portion with a tip, a trailing edge and a leading edge.

When operating in ice forming conditions (either supercooled water ice or high altitude ice crystals), ice can accrete on vanes arranged in the core inlet upstream of the front of the compressor; typically ice is accreted near the outer annulus. When ice is shed from the vanes, which may be owing to aerodynamic loading or vibration, the ice is ingested by the compressor rotor blade stage immediately downstream.

The severity and size of the ice accretion can be significantly higher for geared turbofan architectures owing to the low speed and low hub stagger of the fan.

Different approaches have been proposed to protect the engine against ice accretion. According to one of these approaches, rotor blades are made thicker to withstand ice crystal impacts and reduce blade deflection. This results in heavier blades with reduced aerodynamic performance and efficiency.

Another known approach is that to provide anti-icing systems for the vanes to prevent ice build-up, and to melt any ice that accumulates. For example, the vanes may be provided with electrical heaters, or relatively hot air bled from the compressor may be directed towards the vanes.

Both systems are complicated to implement and detrimental to efficiency.

There is therefore a need for an improved system for ice crystal protection for a gas turbine engine.

According to a first aspect, there is provided a gas turbine engine comprising a fan mounted to rotate about a main longitudinal axis; an engine core, comprising in axial flow series a compressor, a combustor, and a turbine coupled to the compressor through a shaft. The compressor comprises a first stage with a first rotor and a first stator, a second stage with a second rotor and second stator, and third stage with a third rotor and a third stator, each rotor and stator comprising a plurality of blades and vanes, respectively, with a leading edge, a trailing edge and a tip, and adjacent rotors and stators being separated by axial gaps. Between the first rotor and the third rotor, the rotors and stators are arranged such that a sum of mid-span axial gaps between the blade trailing edge of the first rotor and the vane leading edge of the first stator, the vane trailing edge of the first stator and the blade leading edge of the second rotor, the blade trailing edge of the second rotor and the vane leading edge of the second stator, and the vane trailing edge of the second stator and the blade leading edge of the third rotor is equal to $$a \times \sqrt{\frac{\text{inlet flow function}}{10}}$$

wherein a is equal or greater than 75 mm and the inlet flow function is defined as $$\frac{m\sqrt{T}}{P},$$

wherein m is a mass airflow at an inlet to the compressor in kg/s, T is the total temperature at the inlet to the compressor in K, and P is the total pressure at the inlet to the compressor in kPa at the compressor aerodynamic design point.

For example, a may be equal or greater than 80 mm, or equal or greater than 85 mm, or equal or greater than 90 mm.

a may be equal or less than 115 mm. For example, a may be equal or less than 110 mm, or equal or less than 105 mm, or equal or less than 100 mm, or equal or less than 95 mm.

a may be comprised between 75 mm and 115 mm, for example between 80 mm and 110 mm, or between 85 mm and 105 mm, or between 90 mm and 100 mm.

The blades may comprise an aerofoil portion and a root, and a spanwise direction is a direction extending between the tip and the root of the blades, and a chordwise direction is a direction extending between the leading edge and the trailing edge of the blades.

In this context, a mid-span axial gap is defined as the distance along the main longitudinal axis between a blade and an adjacent vane at a mid-span position of the blade. In other words, a mid-span position may be defined at a mid-height between the tip and the root along the span.

In the present disclosure, upstream and downstream are with respect to the air flow through the compressor. Moreover, front and rear is with respect to the gas turbine engine, i.e. the fan being in the front and the turbine being in the rear of the engine.

The first stage may be upstream of the second stage, which may be in turn upstream of the third stage. In other words, the first, second and third stages of the compressor may be the first three stages of the compressor. In each stage, the rotor may be upstream of the stator. The first stage may be at an inlet of the compressor.

Between the first rotor and the third rotor, the present disclosure provides for an axial gap between the rotors and the stators larger than in the prior art, to allow the blades to deflect upon ice crystal impact, without touching the vanes of adjacent stators. The present inventors have understood that the axial gaps between rotors and stators from the first rotor to the third rotor have a more limited impact on efficiency than blade thickness.

By providing the first three rotors and two stators of the compressor distanced according to the disclosure it is possible to prevent damages to the blades and vanes of the compressor and at the same time maintaining high efficiency.

Contrary to the prior art, therefore, rather than increasing the thickness of the blades to reduce the blade deflection, which would be particularly detrimental to efficiency, the present disclosure provides for increasing the axial gaps to allow blade deflection, with a limited effect on efficiency.

In other words, the present disclosure provides for a solution with higher overall efficiency, which is more tolerant to core bird impact, less susceptible to damage, and that does not require complex and/or heavy systems to reduce ice accretion.

A sum of tip axial gaps between the blade trailing edge of the first rotor and the vane leading edge of the first stator, the vane trailing edge of the first stator and the blade leading edge of the second rotor, the blade trailing edge of the second rotor and the vane leading edge of the second stator, and the vane trailing edge of the second stator and the blade leading edge of the third rotor may be equal to $$b \times \sqrt{\frac{\text{inlet flow function}}{10}},$$

wherein b may be equal or greater than 85 mm, and the inlet flow function may be as previously defined.

A tip axial gap between a blade and an immediately downstream vane is defined as the distance along the main longitudinal axis between the blade trailing edge tip, i.e. where the trailing edge and the tip of the blade meet, and the vane leading edge, whereas a tip axial gap between a blade and an immediately upstream vane is defined as the distance along the main longitudinal axis between the blade leading edge tip, i.e. where the leading edge and the tip of the blade meet, and the vane trailing edge.

b may be equal or greater than 90 mm, for example equal greater than 95 mm, or equal or greater than 100 mm, or equal or greater than 105 mm.

b may be equal or less than 130 mm, for example equal or less than 125 mm, or equal or less than 120 mm, or equal or less than 115 mm, or less than 110 mm.

b may be comprised between 85 mm and 130 mm, for example between 90 mm and 130 mm, or between 90 mm and 125 mm, or between 90 mm and 120 mm, or between 95 mm and 125 mm, or between 95 mm and 120 mm, or between 95 mm and 115 mm, or between 100 mm and 120 mm, or between 100 mm and 115 mm.

A mid-span axial distance between the blade trailing edge of the first rotor and the vane leading edge of the first stator may be equal to $$c \times \sqrt{\frac{\text{inlet flow function}}{10}},$$

wherein c is equal or greater than 24 mm and the inlet flow function may be as previously defined.

For example, c may be equal or greater than 25 mm, or equal or greater than 26 mm, or equal or greater than 27 mm.

c may be equal or less than 40 mm. For example, c may be equal or less than 38, or equal or less than 36 mm, or equal or less than 34 mm, or equal or less than 32 mm, or equal or less than 30 mm, or equal or less than 28 mm.

c may be comprised between 24 mm and 40 mm, for example between 25 mm and 40 mm, or between 26 mm and 40 mm, or between 24 mm and 35 mm, or between 25 mm and 35 mm, or between 25 mm and 33 mm, or between 25 mm and 30 mm.

A tip axial distance between the blade trailing edge of the first rotor and the vane leading edge of the first stator may be equal to $$d \times \sqrt{\frac{\text{inlet flow function}}{10}},$$

wherein d may be equal or greater than 23 mm and the inlet flow function may be as previously defined.

For example, d may be equal or greater than 24 mm, or equal or greater than 25 mm, or equal or greater than 26 mm.

d may be equal or less than 40 mm. For example, d may be equal or less than 38, or equal or less than 36 mm, or equal or less than 35 mm, or equal or less than 33 mm.

d may be comprised between 23 mm and 40 mm, for example between 23 mm and 38 mm, or between 23 mm and 33 mm, or between 24 mm and 40 mm, or between 24 mm and 35 mm, or between 26 mm and 35 mm, or between 26 mm and 33 mm.

A mid-span axial distance between the blade trailing edge of the second rotor and the vane leading edge of the second stator may be equal to $$e \times \sqrt{\frac{\text{inlet flow function}}{10}},$$

wherein e may be equal or greater than 24 mm and the inlet flow function may be as previously defined.

For example, e may be equal or greater than 25 mm, or equal or greater than 26 mm, or equal or greater than 27 mm.

e may be equal or less than 38 mm. For example, e may be equal or less than 35, or equal or less than 32 mm, or equal or less than 30 mm, or equal or less than 28 mm.

e may be comprised between 24 mm and 38 mm, for example between 24 mm and 38 mm, or between 24 mm and 35 mm, or between 24 mm and 30 mm, or between 25 mm and 35 mm, or between 25 mm and 33 mm, or between 26 mm and 30 mm.

A mid-span axial distance between the blade trailing edge of the third rotor and the vane leading edge of the third stator may be equal to $$f \times \sqrt{\frac{\text{inlet flow function}}{10}},$$

wherein f may be equal or greater than 15 mm and the inlet flow function may be as previously defined.

For example, f may be equal or greater than 16 mm, or equal or greater than 17 mm, or equal or greater than 18 mm, or equal or greater than 20 mm.

f may be equal or less than 40 mm. For example, f may be equal or less than 38, or equal or less than 35 mm, or equal or less than 32 mm, or equal or less than 30 mm.

f may be comprised between 15 mm and 40 mm, for example between 15 mm and 35 mm, or between 16 mm and 35 mm, or between 16 mm and 30 mm, or between 17 mm and 30 mm.

A tip axial distance between the blade trailing edge of the third rotor and the vane leading edge of the third stator may be equal to $$g \times \sqrt{\frac{\text{inlet flow function}}{10}},$$

wherein g may be equal or greater than 17 mm and the inlet flow function may be as previously defined.

For example, g may be equal or greater than 18 mm, or equal or greater than 19 mm, or equal or greater than 20 mm, or equal or greater than 21 mm.

g may be equal or less than 45 mm. For example, g may be equal or less than 40 mm, or equal or less than 35 mm, or equal or less than 30 mm, or equal or less than 25 mm.

g may be comprised between 17 mm and 45 mm, for example between 17 mm and 40 mm, or between 17 mm and 35 mm, or between 17 mm and 30 mm, or between 18 mm and 45 mm, or between 18 mm and 35 mm, or between 18 mm and 25 mm.

A mid-span axial distance between the vane trailing edge of the first stator and the blade leading edge of the second rotor may be equal to $$h \times \sqrt{\frac{\text{inlet flow function}}{10}},$$

wherein h may be equal or greater than 25 mm and the inlet flow function may be as previously defined.

For example, h may be equal or greater than 26 mm, or equal or greater than 27 mm, or equal or greater than 28 mm, or equal or greater than 30 mm.

h may be equal or less than 40 mm. For example, h may be equal or less than 38 mm, or equal or less than 36 mm, or equal or less than 34 mm, or equal or less than 32 mm.

h may be comprised between 25 mm and 40 mm, for example between 25 mm and 35 mm, or between 26 mm and 35 mm, or between 27 mm and 35 mm, or between 27 mm and 33 mm, or between 28 mm and 35 mm, or between 28 mm and 30 mm.

A tip axial distance between the vane trailing edge of the first stator and the blade leading edge of the second rotor may be equal to $$i \times \sqrt{\frac{\text{inlet flow function}}{10}},$$

wherein i may be equal or greater than 25 mm and the inlet flow function may be as previously defined.

For example, i may be equal or greater than 27 mm, or equal or greater than 28 mm, or equal or greater than 29 mm, or equal or greater than 30 mm.

i may be equal or less than 40 mm. For example, i may be equal or less than 39 mm, or equal or less than 38 mm, or equal or less than 37 mm, or equal or less than 36 mm, or equal or less than 35 mm.

i may be comprised between 25 mm and 40 mm, for example between 25 mm and 38 mm, or between 26 mm and 38 mm, or between 27 mm and 37 mm, or between 27 mm and 35 mm, or between 28 mm and 38 mm, or between 28 mm and 36 mm.

A mid-span axial distance between the vane trailing edge of the second stator and the blade leading edge of the third rotor may be equal to $$l \times \sqrt{\frac{\text{inlet flow function}}{10}},$$

wherein l may be equal or greater than 17 mm and the inlet flow function may be as previously defined.

For example, l may be equal or greater than 18 mm, or equal or greater than 19 mm.

l may be equal or less than 30 mm, for example equal or less than 28 mm, or equal or less than 26 mm, or equal or less than 24 mm, or equal or less than 22 mm.

i may be comprised between 17 mm and 30 mm, for example between 17 mm and 28 mm, or between 18 mm and 30 mm, or between 18 mm and 27 mm, or between 18 mm and 25 mm, or between 18 mm and 23 mm, or between 18 mm and 21 mm.

A tip axial distance between the vane trailing edge of the second stator and the blade leading edge of the third rotor may be equal to $$m \times \sqrt{\frac{\text{inlet flow function}}{10}},$$

wherein m may be equal or greater than 24 mm and the inlet flow function may be as previously defined.

For example, m may be equal or greater than 25 mm, or equal or greater than 26 mm, or equal or greater than 27 mm.

m may be equal or less than 35 mm, equal or less than 33 mm, or equal or less than 31 mm, or equal or less than 30 mm, or equal or less than 28 mm.

The compressor may comprise more than three stages. For example, the compressor may comprise four stages.

The compressor may comprise less than twelve stages, for example less than eleven, or ten stages.

For example, the compressor may comprise 3 to 8 stages.

The compressor may be an intermediate pressure compressor and the gas turbine engine may further comprise a high pressure compressor downstream of the intermediate pressure compressor.

The turbine may be an intermediate pressure turbine and the gas turbine engine may further comprise a high pressure turbine upstream of the intermediate pressure compressor.

The shaft may be a first shaft and the gas turbine engine may further comprise a second shaft coupling the high pressure turbine to the high pressure compressor.

The disclosure may be applied to gas turbine engines with large fan diameter. For example, the fan may have a diameter greater than 230 cm and the inlet flow function may be comprised between 4 and 20 kg/s·K$^{0.5}$/kPa, or between 6 and 20 kg/s·K$^{0.5}$/kPa, or between 8 and 20 kg/s·K$^{0.5}$/kPa. For example the fan diameter may be less than 420 cm, or less than 390 cm.

According to a further aspect, there is provided a gas turbine engine comprising a fan mounted to rotate about a main longitudinal axis; an engine core, comprising in axial flow series a compressor, a combustor, and a turbine coupled to the compressor through a shaft, and a reduction gearbox with an input from the shaft and an output to the fan, the fan being adapted to rotate at a lower rotational rate than the shaft. The compressor comprises a first stage with a first rotor and a first stator, a second stage with a second rotor and second stator, and third stage with a third rotor and a third stator, each rotor and stator comprising a plurality of blades and vanes, respectively, with a leading edge, a trailing edge and a tip, and adjacent rotors and stators being separated by axial gaps. Between the first rotor and the third rotor, the rotors and stators are arranged such that a sum of tip axial gaps between the blade trailing edge of the first rotor and the vane leading edge of the first stator, the vane trailing edge of the first stator and the blade leading edge of the second rotor, the blade trailing edge of the second rotor and the vane leading edge of the second rotor, and the vane trailing edge of the second stator and the blade leading edge of the third rotor is equal to $$b \times \sqrt{\frac{\text{inlet flow function}}{10}},$$

wherein b is greater than 85 mm, and the inlet flow function is as defined in the first aspect.

b may assume all of the values described in relation of the first aspect.

According to a further aspect, there is provided a gas turbine engine comprising: a fan mounted to rotate about a main longitudinal axis; an engine core, comprising in axial flow series a compressor, a combustor, and a turbine coupled to the compressor through a shaft; and a reduction gearbox with an input from the shaft and an output to the fan, the fan being adapted to rotate at a lower rotational rate than the shaft, wherein the compressor comprises a first stage with a first rotor and a first stator, comprising a plurality of blades and vanes, respectively, with a leading edge, a trailing edge and a tip, the blades and vanes being separated by axial gaps. A mid-span axial distance between the blade trailing edge of the first rotor and the vane leading edge of the first stator is equal to $$c \times \sqrt{\frac{\text{inlet flow function}}{10}},$$

wherein c is equal or greater than 24 mm and less than 35 mm, and the inlet flow function is as defined in the first aspect.

c may assume all of the values described in relation of the first aspect.

According to a further aspect, there is provided a gas turbine engine comprising: a fan mounted to rotate about a main longitudinal axis; an engine core, comprising in axial flow series a compressor, a combustor, and a turbine coupled to the compressor through a shaft; and a reduction gearbox with an input from the shaft and an output to the fan, the fan being adapted to rotate at a lower rotational rate than the shaft, wherein the compressor comprises a first stage with a first rotor and a first stator, comprising a plurality of blades and vanes, respectively, with a leading edge, a trailing edge and a tip, the blades and vanes being separated by axial gaps. A tip axial distance between the blade trailing edge of the first rotor and the vane leading edge of the first stator is equal to $$d \times \sqrt{\frac{\text{inlet flow function}}{10}},$$

wherein d is equal or greater than 23 mm and less than 40 mm, and the inlet flow function is as defined in the first aspect.

d may assume all of the values described in relation of the first aspect.

Any of the features of the first aspect may apply in any of the further aspects.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm (around 90.5 inches), 235 cm (around 92.5 inches), 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 13 to 16, or 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 Nkg$^{-1}$ s to 95 Nkg$^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the first and second aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
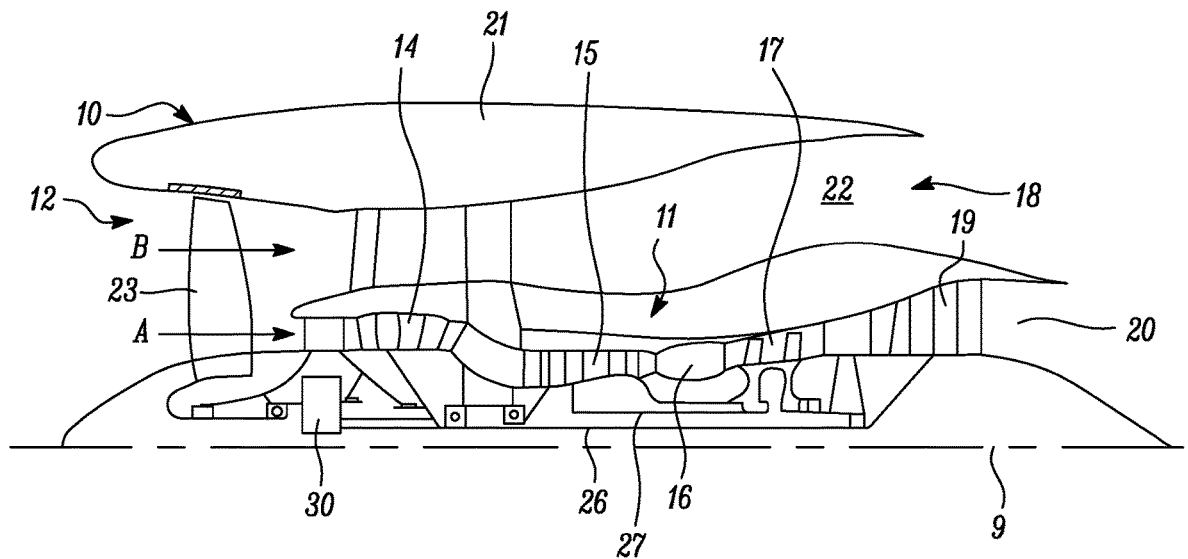
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
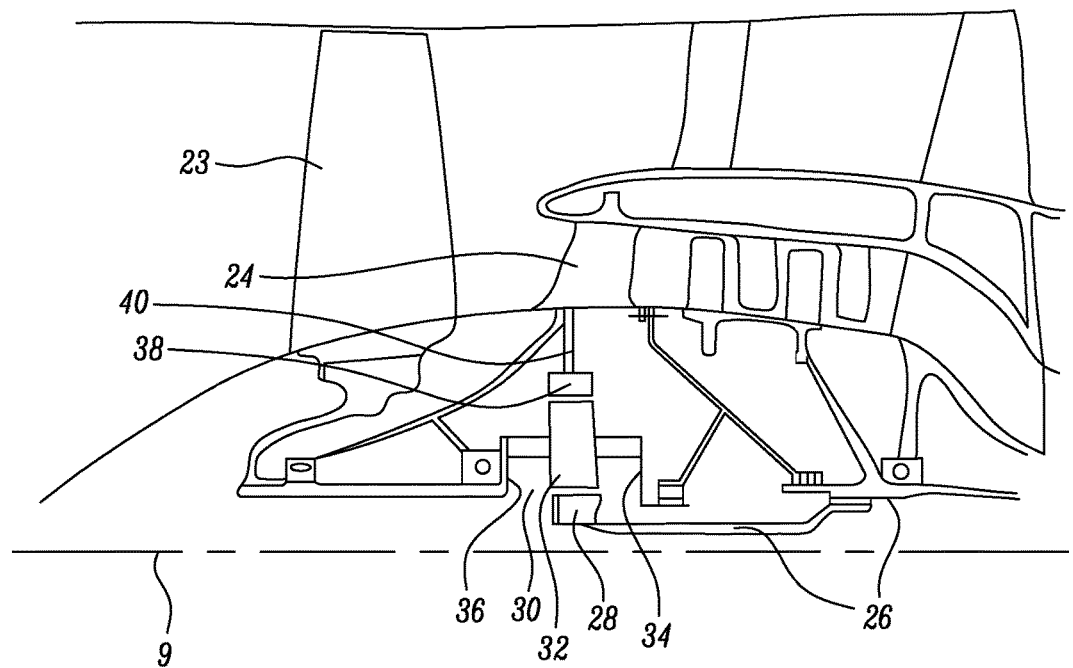
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
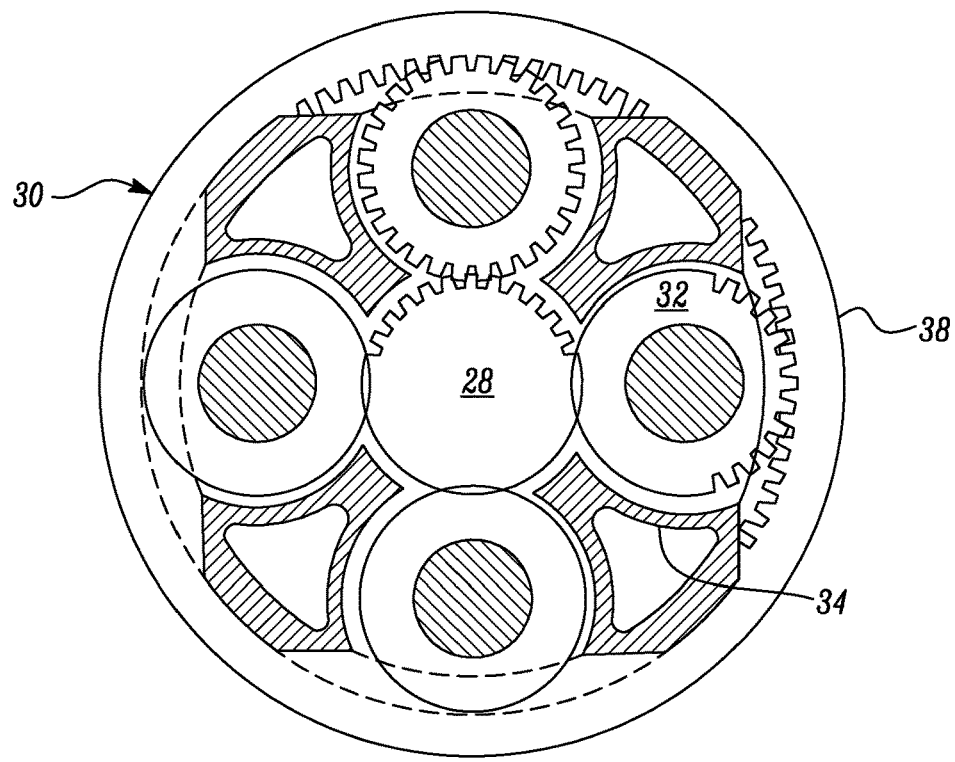
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
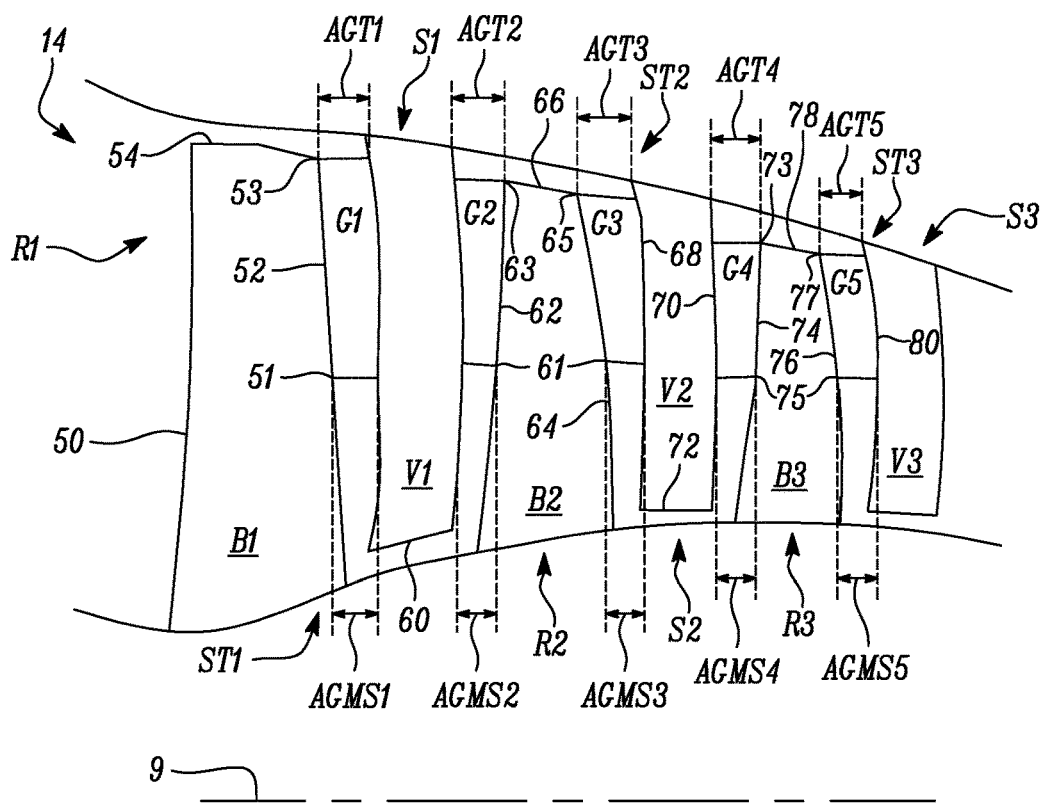
FIG. 4 is an enlarged view of a part of a compressor of the gas turbine engine.

FIG. 4 illustrates a forward part of the low pressure compressor 14 in further detail.

The low pressure compressor 14 comprises a first stage ST1 with a first rotor R1 and a first stator S1, a second stage ST2 with a second rotor R2 and a second stator S2, and a third stage ST3 with a third rotor R3 and third stator S3. The low pressure compressor 14 may comprise other stages, not illustrated.

Each rotor (R1, R2, R3) and stator (S1, S2, S3) comprises a plurality of blades (B1, B2, B3) and vanes (V1, V2, V3), respectively.

In detail, the first rotor R1, the second rotor R2 and the third rotor R3 comprise a row of first blades B1, second blades B2 and third blades B3, respectively; whereas the first stator S1, the second stator S2 and the third stator S3 comprise a row of first vanes V1, second vanes V2, and third vanes V3, respectively.

Each blade B1, B2, B3 and vane V1, V2, V3 comprise an aerofoil portion with a leading edge, a trailing edge and a tip.

The first blades B1 may have a leading edge span comprised between 140 mm and 220 mm and a true chord comprised between 80 mm and 160 mm.

The second blades B2 may have a leading edge span comprised between 120 mm and 180 mm and a true chord comprised between 50 mm and 90 mm.

The third blades B3 may have a leading edge span comprised between 80 mm and 140 mm and a true chord comprised between 35 mm and 70 mm.

The first vanes V1 may have a leading edge span comprised between 120 mm and 180 mm and a true chord comprised between 30 mm and 60 mm.

The second vanes V2 may have a leading edge span comprised between 90 mm and 150 mm and a true chord comprised between 20 mm and 50 mm.

The third vanes V3 may have a leading edge span comprised between 70 mm and 120 mm and a true chord comprised between 15 mm and 45 mm. Blades and vanes are distanced by respective axial gaps, i.e. gaps along the principal rotational axis 9. The axial gaps may vary along the span of the blades.

A first axial gap G1 is defined between the first blade B1 and the first vane V1, a second axial gap G2 is defined between the first vane V1 and the second blade B2, a third axial gap G3 is defined between the second blade B2 and the second vane V2, a forth axial gap G4 is defined between the second vane V2 and the third blade B3, and a fifth axial gap G5 is defined between the third blade B3 and the third vane V3.

In detail, a first mid-span axial gap AGMS1 and a first tip axial gap AGT1 are defined between the trailing edge 52 of the first blade B1 and the leading edge 56 of the first vane V1, at the first blade B1 mid-span position, i.e. at a mid-span position of the first blade B1 aerofoil portion, and at a first blade B1 trailing edge tip 53, respectively.

The first blade B1 trailing edge tip 53 is where the trailing edge 52 and the tip 54 of the first blade B1 meet.

Corresponding second, third, fourth, and fifth mid-span axial gaps AGMS2, AGMS3, AGMS4, AGMS5 and second, third, fourth, and fifth tip axial gaps AGT2, AGT3, AGT4, AGT5 are defined between the trailing edge 58 of the first vane V1 and the leading edge 62 of the second blade B2, between the trailing edge 64 of the second blade B2 and the leading edge 62 of the second vane V2, between the trailing edge 70 of the third vane V3 and the leading edge 74 of the third blade B3, and between the trailing edge 76 of the third blade B3 and the leading edge 80 of the third vane V3.

The second and third mid-span axial gaps AGMS2, AGMS3 are defined at the second blade B2 mid-span position 61, whereas the fourth and fifth mid-span axial gap AGMS4, AGMS5 is defined at the third blade B3 mid-span position 75.

The second tip axial gap AGT2 is defined at a second blade B2 leading edge tip 63, i.e. where the leading edge 62 and the tip 66 of the second blade B2 meet; the third tip axial gap AGT3 is defined at a second blade B2 trailing edge tip 65, i.e. where the trailing edge 64 and the tip 66 of the second blade B2 meet; the fourth tip axial gap AGT4 is defined at a third blade B3 leading edge tip 73, i.e. where the leading edge 74 and the tip 78 of the third blade B3 meet; and the fifth tip axial gap AGT5 is defined at the third blade B3 trailing edge tip 77, i.e. where the trailing edge 76 and the tip 78 of the third blade B3 meet.

It has to be noted that the distance of the blade mid-span positions and blade leading/trailing edge tips to the principal rotational axis 9 depends on the compressor geometry and may differ from blade to blade, as in the example illustrated in the figures.

According to the disclosure, a sum of the first second, third and fourth mid-span axial gaps AGMS1, AGMS2, AGMS3, AGMS4 may be equal to $$a \times \sqrt{\frac{\text{inlet flow function}}{10}},$$

wherein a is equal or greater than 75 mm and the inlet flow function is defined as $$\frac{m\sqrt{T}}{P},$$

wherein m is a mass airflow at an inlet to the compressor in kg/s, T is the total temperature at the inlet to the compressor in K, and P is the total pressure at the inlet to the compressor in kPa at the compressor aerodynamic design point. For most applications, the inlet flow function may be comprised between 4 and 20 kg/s·K$^{0.5}$/kPa, for example between 4 and 18 kg/s·K$^{0.5}$/kPa, or between 6 and 18 kg/s·K$^{0.5}$/kPa, or between 6 and 16 kg/s·K$^{0.5}$/kPa, or between 8 and 20 kg/s·K$^{0.5}$/kPa, or between 8 and 18 kg/s·K$^{0.5}$/kPa.

For example, a may be equal or greater than 80 mm, or equal or greater than 85 mm, or equal or greater than 90 mm.

a may be equal or less than 115 mm. For example, a may be equal or less than 110 mm, or equal or less than 105 mm, or equal or less than 100 mm, or equal or less than 95 mm. The present inventors have understood that when a is greater than 115 mm, the loss in efficiency exceeds an acceptable value and the benefit in ice crystal impact does not compensate for the loss in efficiency.

Accordingly, a may be comprised between 75 mm and 115 mm, for example between 80 mm and 110 mm, or between 85 mm and 105 mm, or between 90 mm and 100 mm.

A sum of the first, second, third and fourth tip axial gaps AGT1, AGT2, AGT3, AGT4 may be equal to $$b \times \sqrt{\frac{\text{inlet flow function}}{10}},$$

wherein b may be equal or greater than 85 mm, and the inlet flow function may be as previously defined.

b may be equal or greater than 90 mm, for example equal or greater than 95 mm, or equal or greater than 100 mm, or equal or greater than 105 mm.

b may be equal or less than 130 mm, for example equal or less than 125 mm, or equal or less than 120 mm, or equal or less than 115 mm, or equal or less than 110 mm. As previously b may be comprised between 85 mm and 130 mm, for example between 90 mm and 130 mm, or between 90 mm and 125 mm, or between 90 mm and 120 mm, or between 95 mm and 125 mm, or between 95 mm and 120 mm, or between 95 mm and 115 mm, or between 100 mm and 120 mm, or between 100 mm and 115 mm.

In the illustrated embodiment, the first mid-span axial gap AGMS1 is greater than the second mid-span axial gap AGMS2, the third mid-span axial gap AGMS3, the fourth mid-span axial gap AGMS4, and the fifth mid-span axial gap AGMS5.

In alternative, not illustrated embodiments, the first mid-span axial gap AGMS1 may be less than the second mid-span axial gap AGMS2, which in turn may be greater than the third mid-span axial gap AGMS3.

In an embodiment, the first mid-span axial gap AGMS1 is equal to $$c \times \sqrt{\frac{\text{inlet flow function}}{10}},$$

wherein c is equal to 25 mm; the second mid-span axial gap AGM2 is equal to $$h \times \sqrt{\frac{\text{inlet flow function}}{10}},$$

wherein h is equal to 30 mm; the third mid-span axial gap AGMS3 is equal to $$n \times \sqrt{\frac{\text{inlet flow function}}{10}},$$

wherein n is equal to 18 mm; the fourth mid-span axial gap AGMS4 is equal to $$l \times \sqrt{\frac{\text{inlet flow function}}{10}},$$

wherein l is equal to 20 mm; and the fifth mid-span axial gap AGMS5 is equal to $$f \times \sqrt{\frac{\text{inlet flow function}}{10}},$$

wherein f is equal to 15 mm. In such embodiment, therefore, a is equal to 93 mm.

In an alternative embodiment, for the first, second, third, fourth, and fifth mid-span axial gap AGMS1, AGMS2, AGMS3, AGMS4, AGSM5 the parameters c, h, n, l, and f are equal to 27 mm, 28 mm, 21 mm, 20 mm, and 29 mm, respectively. In such alternative embodiment, a is equal to 96 mm In a further alternative embodiment, for the first, second, third, and fourth mid-span axial gap AGMS1, AGMS2, AGMS3, AGMS4 the parameters c, h, n, and l are equal to 20 mm, 20 mm, 18 mm, and 17 mm, respectively. In such further alternative embodiment, a is equal to 75 mm.

Moreover, in the illustrated example, the first tip axial gap AGT1 is greater than the second tip axial gap AGT2, and the third tip axial gap AGT3 is greater than the fourth tip axial gap AGT4. In this embodiment, the blades at the tip have more room to deflect downstream than upstream.

In an alternative, not illustrated embodiment, the second tip axial gap AGT2 is greater than the first and third tip axial gap AGT1, AGT3, the latter in turn being greater than the fourth tip axial gap AGT4.

In an embodiment, the first tip axial gap AGT1 is equal to $$d \times \sqrt{\frac{\text{inlet flow function}}{10}},$$

wherein d is equal to 27 mm; the second tip axial gap AGT2 is equal to $$i \times \sqrt{\frac{\text{inlet flow function}}{10}},$$

wherein i is equal to 35 mm; the third tip axial gap AGT3 is equal to $$e \times \sqrt{\frac{\text{inlet flow function}}{10}},$$

wherein e is equal to 25 mm; the fourth tip axial gap AGT4 is equal to $$m \times \sqrt{\frac{\text{inlet flow function}}{10}},$$

wherein m is equal to 24 mm, and the fifth tip axial gap AGT5 is equal to $$g \times \sqrt{\frac{\text{inlet flow function}}{10}},$$

wherein g is equal to 23 mm. In such embodiment, therefore, b is equal to 111 mm.

In an alternative embodiment, for the first, second, third, fourth and fifth tip axial gap AGT1, AGT2, AGT3, AGT4, AGT5 the parameters d, i, e, m, and g are equal to 30 mm, 28 mm, 27 mm, 25 mm, and 41 mm respectively, and b is therefore equal to 110 mm.

In a further alternative embodiment, for the first, second, third, and fourth tip axial gap AGT1, AGT2, AGT3, AGT4 the parameters d, i, e, and m, are equal to 22 mm, 24 mm, 20 mm, and 19 mm, respectively, and b is therefore equal to 85 mm.

Although only the first three stages ST1, ST2, and ST3 have been illustrated in FIG. 4, the low pressure compressor 14 may comprise three or more than three stages, for example up to eight stages.

Equally, the disclosure may be applied to the high pressure compressor 15, in particular to the first three stages of the high pressure compressor 15, which in turn may comprise 3 to 12 stages, for example up to 11 stages, or up to 10 stages.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:
1. A gas turbine engine comprising:
a fan mounted to rotate about a main longitudinal axis,
an engine core, comprising in axial flow series a compressor, a combustor, and a turbine coupled to the compressor through a shaft, and
a reduction gearbox with an input from the shaft and an output to the fan, the fan being adapted to rotate at a lower rotational rate than the shaft,
wherein the compressor comprises a first stage with a first rotor and a first stator, a second stage with a second rotor and a second stator, and a third stage with a third rotor and a third stator, each rotor and stator comprising a plurality of blades and vanes, respectively, with a leading edge, a trailing edge and a tip, and adjacent rotors and stators being separated by axial gaps,
wherein between the first rotor and the third rotor, the rotors and stators are arranged such that a sum of mid-span axial gaps between the blade trailing edge of the first rotor and the vane leading edge of the first stator, the vane trailing edge of the first stator and the blade leading edge of the second rotor, the blade trailing edge of the second rotor and the vane leading edge of the second stator, and the vane trailing edge of the second stator and the blade leading edge of the third rotor is equal to

$$a \times \sqrt{\frac{\text{inlet flow function}}{10}},$$

wherein a is equal or greater than 75 mm and less than 115 mm, and the inlet flow function is defined as $$\frac{m\sqrt{T}}{P},$$

wherein m is a mass airflow at an inlet to the compressor in kg/s, T is the total temperature at the inlet to the compressor in K, and P is the total pressure at the inlet to the compressor in kPa at the compressor aerodynamic design point, and the axial gaps between the rotors and stators in each of the first stage, second stage, and third stage are provided such that the respective blades of each rotor are able to deflect upon ice crystal impact without touching the respective vanes of the adjacent stator.

2. The gas turbine engine according to claim 1, wherein a sum of tip axial gaps between the blade trailing edge of the first rotor and the vane leading edge of the first stator, the vane trailing edge of the first stator and the blade leading edge of the second rotor, the blade trailing edge of the second rotor and the vane leading edge of the second stator, and the vane trailing edge of the second stator and the blade leading edge of the third rotor is equal to $$b \times \sqrt{\frac{\text{inlet flow function}}{10}},$$

wherein b is equal or greater than 85 mm and less than 130 mm, and the inlet flow function is defined as in claim 1.

3. The gas turbine engine according to claim 1, wherein a mid-span axial distance between the blade trailing edge of the first rotor and the vane leading edge of the first stator is equal to $$c \times \sqrt{\frac{\text{inlet flow function}}{10}},$$

wherein c is equal or greater than 24 mm and less than 40 mm, and the inlet flow function is defined as in claim 1.

4. The gas turbine engine according to claim 1, wherein a tip axial distance between the blade trailing edge of the first rotor and the vane leading edge of the first stator is equal to $$d \times \sqrt{\frac{\text{inlet flow function}}{10}},$$

wherein d is equal or greater than 23 mm and less than 40 mm, and the inlet flow function is defined as in claim 1.

5. The gas turbine engine according to claim 1, wherein a is equal or greater than 85 mm and less than 105 mm, and the inlet flow function is between 6 and 20 kg/s·K$^{0.5}$/kPa.

6. The gas turbine engine according to claim 1, wherein a tip axial distance between the blade trailing edge of the second rotor and the vane leading edge of the second stator is equal to $$e \times \sqrt{\frac{\text{inlet flow function}}{10}},$$

wherein e is equal or greater than 24 mm and less than 38 mm, and the inlet flow function is defined as in claim 1.

7. The gas turbine engine according to claim 1, wherein a mid-span axial distance between the blade trailing edge of the third rotor and the vane leading edge of the third stator is equal to $$f \times \sqrt{\frac{\text{inlet flow function}}{10}},$$

wherein f is equal or greater than 15 mm and less than 40 mm, and the inlet flow function is defined as in claim 1.

8. The gas turbine engine according to claim 1, wherein a tip axial distance between the blade trailing edge of the third rotor and the vane leading edge of the third stator is equal to $$g \times \sqrt{\frac{\text{inlet flow function}}{10}},$$

wherein g is equal or greater than 17 mm and less than 45 mm, and the inlet flow function is defined as in claim 1.

9. The gas turbine engine according to claim 1, wherein a mid-span axial distance between the vane trailing edge of the first stator and the blade leading edge of the second rotor is equal to $$h \times \sqrt{\frac{\text{inlet flow function}}{10}},$$

wherein h is equal or greater than 25 mm and less than 40 mm, and the inlet flow function is defined as in claim 1.

10. The gas turbine engine according to claim 1, wherein a tip axial distance between the vane trailing edge of the first stator and the blade leading edge of the second rotor is equal to $$i \times \sqrt{\frac{\text{inlet flow function}}{10}},$$

wherein i is equal or greater than 25 mm and less than 40 mm, and the inlet flow function is defined as in claim 1.

11. The gas turbine engine according to claim 1, wherein a mid-span axial distance between the vane trailing edge of the second stator and the blade leading edge of the third rotor is equal to $$l \times \sqrt{\frac{\text{inlet flow function}}{10}},$$

wherein l is equal or greater than 17 mm and less than 30 mm, and the inlet flow function is defined as in claim 1.

12. The gas turbine engine according to claim 1, wherein a tip axial distance between the vane trailing edge of the second stator and the blade leading edge of the third rotor is equal to $$m \times \sqrt{\frac{\text{inlet flow function}}{10}},$$

wherein m is equal or greater than 24 mm and less than 30 mm, and the inlet flow function is defined as in claim 1.

13. The gas turbine engine according to claim 1, wherein the compressor comprises 3 to 8 stages.

14. The gas turbine engine according to claim 1, wherein the compressor is an intermediate pressure compressor, the turbine is an intermediate pressure turbine, the shaft is a first shaft, the gas turbine engine further comprising a high pressure compressor downstream of the intermediate pressure compressor, a high pressure turbine upstream of the intermediate pressure turbine, and a second shaft coupling the high pressure turbine to the high pressure compressor.

15. The gas turbine engine according to claim 1, wherein the fan has a diameter greater than 230 cm and less than 420 cm, and the inlet flow function is comprised between 4 and 20 kg/s·K$^{0.5}$/kPa.

16. A gas turbine engine comprising:
a fan mounted to rotate about a main longitudinal axis,
an engine core, comprising in axial flow series a compressor, a combustor, and a turbine coupled to the compressor through a shaft, and
a reduction gearbox with an input from the shaft and an output to the fan, the fan being adapted to rotate at a lower rotational rate than the shaft,
wherein the compressor comprises a first stage with a first rotor and a first stator, comprising a plurality of blades and vanes, respectively, with a leading edge, a trailing edge and a tip, the blades and vanes being separated by axial gaps,
wherein a mid-span axial distance between the blade trailing edge of the first rotor and the vane leading edge of the first stator is equal to $$c \times \sqrt{\frac{\text{inlet flow function}}{10}},$$

wherein c is equal or greater than 24 mm and less than 35 mm, and the inlet flow function is defined as $$\frac{m\sqrt{T}}{P},$$

wherein m is a mass airflow at an inlet to the compressor in kg/s, T is the total temperature at the inlet to the compressor in K, and P is the total pressure at the inlet to the compressor in kPa at the compressor aerodynamic design point, and the axial gaps between the blades and vanes of the first stage are provided such that the blades of the first rotor are able to deflect upon ice crystal impact without touching the vanes of the adjacent first stator.

17. A gas turbine engine comprising:
a fan mounted to rotate about a main longitudinal axis,
an engine core, comprising in axial flow series a compressor, a combustor, and a turbine coupled to the compressor through a shaft, and
a reduction gearbox with an input from the shaft and an output to the fan, the fan being adapted to rotate at a lower rotational rate than the shaft,
wherein the compressor comprises a first stage with a first rotor and a first stator, comprising a plurality of blades and vanes, respectively, with a leading edge, a trailing edge and a tip, the blades and vanes being separated by axial gaps,
wherein a tip axial distance between the blade trailing edge of the first rotor and the vane leading edge of the first stator is equal to $$d \times \sqrt{\frac{\text{inlet flow function}}{10}},$$

wherein d is equal or greater than 23 mm and less than 40 mm, and the inlet flow function is defined as $$\frac{m\sqrt{T}}{P},$$

wherein m is a mass airflow at an inlet to the compressor in kg/s, T is the total temperature at the inlet to the compressor in K, and P is the total pressure at the inlet to the compressor in kPa at the compressor aerodynamic design point, and the axial gaps between the blades and vanes of the first stage are provided such that the blades of the first rotor are able to deflect upon ice crystal impact without touching the vanes of the adjacent first stator.

* * * * *